United States Patent
Valola et al.

(10) Patent No.: US 9,566,740 B2
(45) Date of Patent: Feb. 14, 2017

(54) BEND FIXTURE

(71) Applicant: Uponor Innovation Ab, Nastola (FI)

(72) Inventors: Jonne Valola, Nastola (FI); Mika Uosukainen, Lahti (FI); Bengt Isaksson, Virsbo (SE); Mika Savolainen, Lahti (FI)

(73) Assignee: Uponor Innovation Ab, Virsbo (SE)

( * ) Notice: Subject to any disclaimer, the term of this patent is extended or adjusted under 35 U.S.C. 154(b) by 0 days.

(21) Appl. No.: 14/953,562

(22) Filed: Nov. 30, 2015

(65) Prior Publication Data

US 2016/0153588 A1    Jun. 2, 2016

(30) Foreign Application Priority Data

Nov. 28, 2014   (EP) ..................................... 14195410

(51) Int. Cl.
| F16L 3/08 | (2006.01) |
| B29C 53/08 | (2006.01) |
| F16L 3/12 | (2006.01) |
| B29K 105/00 | (2006.01) |
| B29L 23/00 | (2006.01) |
| E03C 1/02 | (2006.01) |
| F16L 5/00 | (2006.01) |

(52) U.S. Cl.
CPC .............. B29C 53/08 (2013.01); F16L 3/1226 (2013.01); *B29K 2105/258* (2013.01); *B29L 2023/22* (2013.01); *E03C 1/021* (2013.01); *F16L 5/00* (2013.01)

(58) Field of Classification Search
CPC .............. F16L 3/13; F16L 3/04; F16L 3/1226; B60R 16/0222; B29K 2105/258; H02G 3/26; E03C 1/021; B29C 53/08

USPC ........ 248/544, 49, 65, 70, 73; 138/108, 110, 138/112
See application file for complete search history.

(56) References Cited

U.S. PATENT DOCUMENTS

| 6,085,795 A * | 7/2000 | Ogawa | ................ B60R 16/0222 138/108 |
| 6,830,225 B2 * | 12/2004 | Kato | .................... H02G 3/0487 248/49 |

FOREIGN PATENT DOCUMENTS

| EP | 2014838 B1 | 4/2013 |
| GB | 2512580 A | 10/2014 |
| WO | WO 98/36481 A1 | 8/1998 |

* cited by examiner

*Primary Examiner* — Todd M Epps
(74) *Attorney, Agent, or Firm* — Occhiuti & Rohlicek LLP

(57) ABSTRACT

A bend fixture for bending a medium pipe comprises a body part comprising a tubular support to receive a section of a medium pipe therein, an inner bend support to allow the medium pipe to be bent about the inner bend support, and an outer bend support to support the medium pipe from an outer side of the bend to keep the medium pipe bent. The outer bend support is coupled to the body part via a hinge and is turnable between an open position to allow the section of the medium pipe in substantially straight state to be inserted into the tubular support, and a closed position to keep the medium pipe bent about the inner bend support. The bend fixture comprises a pipe coupling arrangement for coupling together the outer bend support, in its open position, and the medium pipe outside the section in the tubular support.

20 Claims, 4 Drawing Sheets

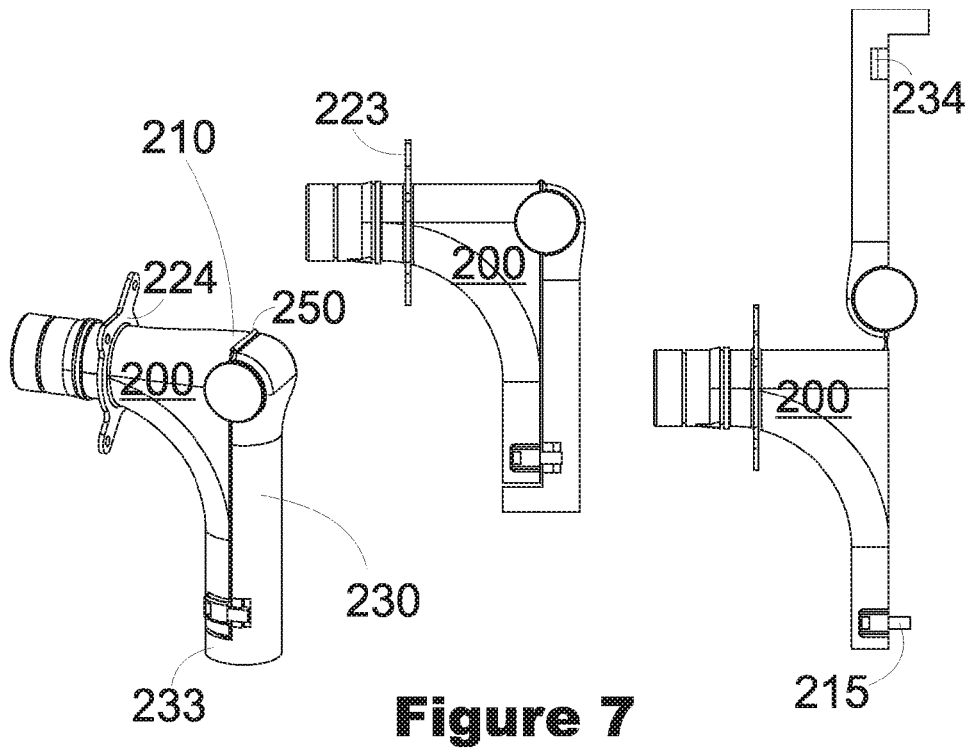

Figure 7

Inserting a section of a medium pipe into the tubular support, the outer bend suppport being in an open position Coupling together the outer bend support and the medium pipe outside the section inserted into the tubular support Turning the outer bend support towards its closed position Exerting a force to the medium pipe outside the bend fixture to bend the medium pipe about the inner bend support

Figure 8

BEND FIXTURE

RELATED APPLICATION

Under 35 USC 119, this application claims the benefit of the priority date of European Application No. 14195410.7, filed on Nov. 28, 2014, the contents of which are herein incorporated by reference.

FIELD OF THE INVENTION

The present invention relates generally to plumbing arrangements for water and heat supply in buildings. In particular, the present invention relates to bending arrangements for bending a medium pipe and supporting the thereby formed bend.

BACKGROUND OF THE INVENTION

Flexible plastic water pipes made of e.g. cross-linked polyethylene PEX are commonly used to form the tap water networks as well as heating water networks or, more generally, heating medium networks in buildings. To protect the actual water pipe (or, more generally, a "medium pipe" for any fluid to be led in the pipe) and, on the other hand, to collect the possible leak water from damaged water pipes or leaking connections, the water pipe is often covered by a protective tube. This is the case especially in tap water systems, but protective pipes may be used in heating systems as well.

Water pipes for tap water and heating purposes, such as those made of PEX, are typically relatively rigid structures, however allowing certain bending thereof. Bending of such pipes is required, for example, for bending a heating pipe running in a floor (or ceiling) structure upwards (downwards), out of the floor structure so that it can be connected to a radiator or a manifold. Correspondingly, a tap water pipe running inside a wall structure shall be bent out of the wall structure for being connected to a tap assembly.

One conventional solution to the latter application is a wall box with an inner tap elbow forming the actual bend. The water pipe is connected to one end of the tap elbow, whereas the actual tap assembly is connected to the opposite end thereof. However, a termination box is not suitable for applications where connections of water pipes inside wall or floor structures are to be avoided.

According to another approach, a bend of the water pipe itself is formed within a wall, floor, or ceiling structure, and the bent pipe is brought out of such structure. In this approach, the connection to a tap assembly, a radiator, or a manifold is made outside the structure.

Due to the rigid nature of the typical water pipes, certain force is required to bend the pipe. On the other hand, firm support is required to maintain the bent pipe permanently in its bent state.

Various bend fixtures and bend support elements are known. As one example, a wall bend fixture is disclosed in EP 2014838 B1. The disclosed wall bend fixture comprises an in passage and an out passage to receive a water pipe with a protective pipe thereon. The in passage is formed by a first pipe holder with a half circular cross section, whereas the out passage is formed by a passage part. Between the in passage and the out passage, there is a pipe holder with a radial curvature intended to support the protective pipe. EP 2014838 B1 also discloses a wall bend fixture in which an in passage and an out passage are formed by a supportive section which is divisible into two portions.

SUMMARY OF THE INVENTION

Novel bend fixture and method for bending a medium pipe may be provided as characterized by what is specified in claims 1 and 15, respectively.

According to a device aspect, a bend fixture may be provided for bending a medium pipe. The medium pipe may be a pipe for leading any fluid or flowable medium, such as water, in it. Examples of such medium pipes are water pipes used to form the tap water networks and heating water networks or, more generally, heating medium networks in various buildings.

Such medium pipe may be formed of e.g. cross-linked polyethylene PEX. Other possible pipe materials are e.g. polyethylene PE in general, polyethylene for raised temperature PE-RT, polypropylene (PP), and polybutylene PB. Further, such medium pipe may also have a multi-layer structure, such as any of those used in composite pipes comprising a plastic material and a metal. For example, such composite pipe may comprise a core metal pipe, made of e.g. overlap welded aluminum, sandwiched between an inner and an outer plastic pipe, made of e.g. PE-RT. In general, the use of the bend fixture is not limited to any particular pipe construction or material(s).

By "bending" a medium pipe is meant here both forming a bend in such pipe, and supporting such bent pipe to keep it in its bent state.

The bend fixture comprises a body part, which in turn comprises a tubular support configured to receive and hold a first section of a medium pipe therein, and an inner bend support configured to allow a medium pipe, a section of which being received and held in the tubular support, to be bent about the inner bend support.

By said tubular support is meant a support structure comprising an inner surface defining a tubular channel into which a medium pipe may be inserted. The tubular support may be formed as a cylindrical tube having a wall with uniform thickness surrounding such tubular channel. However, the tubular support is not necessarily formed as such true "tube", but a tubular inner channel may be formed within a tubular support having any appropriate structure and outer shape.

Said "inner" bend support refers to the fact that such support, about which a medium pipe, a section of which being within the tubular support, is bent to form a bend, supports the bent medium pipe from the inner side of the bend.

In addition to the body part, the bend fixture comprises an outer bend support. The outer bend support is configured to support a medium pipe, a section of which being received and held in the tubular support, the medium pipe being bent about the inner bend support, from an outer side of the bend so as to keep the medium pipe bent, i.e. to retain it in its bend state.

Thus, using the bend fixture, a bend may be formed in a medium pipe as supported by the tubular support, the inner bend support, and the outer bend support. As is clear for a person skilled in the art, said retaining of the medium pipe bent may be enabled by that the outer bend support and the tubular support lie at opposite sides of the inner bend support so that the inner bend support lies between the outer bend support and the tubular support. Then, when bending a medium pipe, a section of which is inserted in, i.e. received and held by the tubular support, about the inner bend support, the tubular support prevents the medium pipe section therein from turning towards the outer side of the bend, which would result in straightening of the medium pipe from its bent state. On the other hand, at the other side of the inner bend support, the outer bend support serves for the same purpose. Also the tubular support serves for supporting a bent medium pipe from the outer side of the bend. Thereby it can be considered as another "outer bend support".

The outer bend support is coupled, i.e. structurally connected, to the body part via a hinge. It is turnable between an open position to allow a section of a medium pipe in substantially straight state to be inserted into the tubular support, and a closed position to keep a medium pipe, a section of which being received and held in the tubular support, bent about the inner bend support.

Thus, in said open position, the outer bend support provides an unobstructed access of a section of a substantially straight medium pipe into the tubular support. By the substantially straight state of the medium pipe is meant here that with the outer bend support in its open position, the medium pipe does not need to be substantially bent in order to insert it into the tubular support. Naturally, it may be bent if appropriate for some other reasons.

Advantageously, the bend fixture comprises a pipe coupling arrangement configured to couple together the outer bend support, in its open position, and a medium pipe, a section of which being received and held in the tubular support, outside the section in the tubular support.

Again, "coupling" means here structural connection between the coupled parts, i.e. the outer bend support and the medium pipe at a coupling location outside the section lying in the tubular support, so that they are not freely movable relative to each other. In particular, they are not freely movable relative to each other in directions which are perpendicular to the longitudinal or tangential direction of the medium pipe. By tangential direction is meant here the "longitudinal" direction at a location where the pipe is bent. Those perpendicular directions include especially perpendicular directions in a fictitious plane along or in which plane the outer bend support is turnable. Thus, when turning the outer bend support, the medium pipe coupled to it, with a section of the medium pipe lying in the tubular support, has to bend together with the turning outer bend support. The same applies vice versa, i.e. when bending the medium pipe about the inner bend support, the outer bend support coupled to it has to turn towards to its closed position. The latter provides a great advantage, as explained below.

Said coupling does not necessitate that the outer bend support and a medium pipe, a section of which is inserted into the tubular support, are not freely movable relative to each other in the longitudinal or tangential direction of the medium pipe. In contrary, it may be advantageous that such medium pipe is easily movable in such longitudinal or tangential direction relative to the outer bend support, as is discussed in the detailed description.

The medium pipe may be bent about the inner bend support e.g. by pushing or pulling the medium pipe at a location outside the entire bend fixture, whereby the outer bend support, coupled to the medium pipe, follows the medium pipe, thereby turning towards the closed position of the outer bend support. This allows using the medium pipe itself as a lever arm, the length of which being freely chosen, facilitating the bending of the medium pipe and the turning of the outer bend support. Thus, a bend formation may be facilitated e.g. in comparison to a situation where a medium pipe would be bent by just turning the outer bend support towards the closed position thereof, whereby the bending moment with a given bending force would be limited by the limited furthest distance of the outer bend support from the inner bend support.

Said pipe coupling arrangement may comprise any appropriate coupling elements or structures appropriate to provide said coupling effect. In a simple example, the coupling arrangement may comprise just a guiding structure for a cable tie or some other external binding element, by means of which the outer bend support may be coupled to the medium pipe, to a portion thereof outside then section lying in the tubular support.

In an embodiment, the pipe coupling arrangement comprises a coupling ring configured to allow insertion of a medium pipe through it. By a coupling ring is meant a curved structure curving around a medium pipe so as to at least partially surround it. At least partial surrounding means that the coupling ring may be open, i.e. have a limited opening, at the side of the inner bend support, i.e. at the inner side of a bend formed or to be formed in a medium pipe. The coupling ring may also be a closed ring configured to completely encircle a cross-sectional circumference of a medium pipe inserted through the coupling ring.

By means of a coupling ring, the coupling between a medium pipe and the outer bend support may be made simply by inserting a medium pipe end through the coupling ring and then further to the tubular support so that a section of the medium pipe is received in the tubular support, whereby another section or point of the medium pipe remains coupled together with the outer bend support.

The outer bend support may have a first end and a second end, wherein it may be coupled to the body part via the hinge from the first end, the pipe coupling arrangement being located substantially at the second end. Thus, in this embodiment, the pipe coupling arrangement, comprising e.g. a coupling ring, and the hinge are arranged substantially at opposite ends of the outer end support.

The inner bend support may comprise any appropriate structure(s) allowing said bending of a medium pipe about it. Such structure may form a continuous supporting surface. Alternatively, it may comprise, for example, discrete supporting ridges or other structures. In an embodiment, the inner bend support comprises a curved support surface extending from an inner surface of the tubular support.

The outer bend support may comprise any appropriate structure(s) suitable for said supporting of a bent medium pipe from the outer side of the bend. It may comprise one or more discrete support elements. Alternatively, or additionally, it may comprise one or more continuous support surfaces which may be shaped, for example, to adapt to an outer surface of a bent medium pipe.

In an embodiment, the hinge is a living hinge. As generally known, a living hinge is a hinge formed as a thin material section between two parts made of the same material, wherein the living hinge and the two parts connected thereby are formed as one single integral structure. A living hinge as the hinge coupling together the body part and the outer bend support enables a structurally simple, integral bend fixture which can be straightforwardly manufactured in single process without any need for subsequent assembly steps. For example, when formed of a moldable plastic material, the bend fixture may be manufactured by a single molding process. The living hinge may be formed into its final form in such molding process. Alternatively, the manufacturing of the bend fixture may comprise machining the living hinge afterwards, e.g. by partial removal of material at the intended hinge location to forma a sufficiently thin hinge structure.

Advantageously, the living hinge may be located outside a fictitious extension of a tubular channel formed by the tubular support to allow unobstructed insertion of a section of a medium pipe in straight state into the tubular support.

To keep the outer bend support in its closed position, thereby retaining a medium pipe bent, the body part and the outer bend support may comprise complementary snap elements to couple, with the outer bend support in its closed position, the outer bend support to the body part by means of a snap joint. As generally known, a snap joint is a general term for jointing two components together by means of a protrusion in one component, which protrusion is reversibly deflectable, thereby allowing a sliding movement of the two components relative to each other until the deflected protrusion is caught in a depression or undercut in the mating component.

In an embodiment, the complementary snap elements comprise a snap-fitting hook arranged in the body part and a complementary recess arranged in the outer bend support. With the snap elements being arranged this way, it is possible to implement a snap joint arrangement which may be opened from the back side of the bend fixture, back side referring here to the outer side of a bend formed in a medium pipe by means of the bend fixture. This may be advantageous e.g. in a case where the bend support is used to form a lead-through where a medium pipe running within a wall or other building structure is to be bent and brought out of such structure. Typically, such structure may comprise a panel through which the tubular support may be inserted so that the bend support extends from the back side of the panel to the front side thereof. Then, the coupling arrangement may be accessible from the back side of the panel and the bend fixture only.

The snap-fitting hook may comprise an arm and a tip, the tip being adapted to fit in the complementary recess and extending from the arm to one side thereof, wherein the snap-fitting hook may further comprise a handling protrusion extending from the arm to an opposite side thereof. Such handling protrusion may facilitate opening of a closed snap joint formed by the snap-fitting hook and the complementary recess.

In an embodiment, the complementary recess is formed on an outer surface of the coupling ring, and the arm is formed as a curved structure substantially following, with a snap joint formed by the snap-fitting hook and the complementary recess, said outer surface of the coupling ring. Thus, such arm may, with the snap joint being formed, curvedly surround a part of the circumference of the coupling ring. There may be two such pairs of a snap-fitting hook and complementary recess, those two pairs being located so that the snap-fitting hooks surround the coupling ring at opposite sides thereof. Advantageously, such two snap-fitting hooks and the corresponding complementary recesses may be so located that with the snap joints being formed, the body part together with the snap-fitting hooks surround more than a half of the circumference of the coupling ring. Thereby, a secure coupling between the body part and the outer bend support may be provided.

In the above, a "medium pipe" has been discussed, meaning that a medium pipe, such as a water pipe for tap water or a heating water pipe or a pipe for another heat transfer medium, may be a plain pipe as such. However, the bend fixture may also be a bend fixture for bending a medium pipe located within a protective tube. Then, all what is stated above about or in respect of a "medium pipe" may be also read to mean a medium pipe with a protective thereon, or a protective tube with a medium pipe therein. The general nature of the bend fixture itself is not necessarily different in those two cases. However, the dimensions thereof may be adapted differently depending on whether the bend support is intended for bending a plain medium pipe or a medium pipe in a protective tube.

In an embodiment for bending a medium pipe located within a protective tube, the protective tube having a corrugated outer surface, the body part comprises a ridge configured to be fitted in a groove of the corrugated outer surface of a protective tube of a medium pipe bent about the inner bend support, the ridge being located off a plane coinciding with a central longitudinal cross-sectional plane of a medium pipe which is bent about the inner bend support. At such central longitudinal cross-sectional plane of a medium pipe with a corrugated protective tube thereon, the grooves of the corrugated protective tube may become closed at the inner side of the bend. Said location of the ridge aside from said plane coinciding with the central longitudinal cross-sectional plane of a medium pipe which is bent by means of the bend fixture allows the ridge being located within a groove in the bent section of the medium pipe. This is due to the fact that off said central plane, the grooves are not, at least not completely, closed.

The bend fixture may be specifically designed for forming a lead-through arrangement through a wall having a hole, wherein the body part comprises a stop surface configured to set, when inserting the tubular support through the hole, against the wall. Such stop surface may thereby serve for ensuring a correct location of the bend fixture relative to the wall. In other words, the tubular support may be located so far through the hole that the stop surface is set against the wall, thereby stopping the bend fixture.

The bend fixture may comprise a substantially planar support surface for supporting the bend fixture against an external support surface, such as a wall panel of a wall structure in a building or a specific mounting panel. Such support surface may be formed e.g. as a surface of a mounting plate through which the bend fixture may also be mounted, e.g. by means of screws, to an external structure, such as such wall panel. There may be several support surfaces facing to different sides of the bend fixture.

A medium pipe bend arrangement may also be provided, comprising a bend fixture according to any example described above and a medium pipe, possibly located within a protective tube, a section of the medium pipe together with corresponding section of the possible protective tube being located in the tubular support. Such medium pipe bend arrangement may be used to form a lead-through arrangement of a medium pipe through a wall panel, an assembly plate, or other plate-like structure.

The medium pipe may be adapted for forming a bend with any appropriate radius of curvature and desired bending angle. Typically, the bending angle required e.g. in tap water and heating medium networks in buildings is 90 degrees.

The medium pipe may be formed of a moldable plastic material, such as glass fibre-reinforced polypropene or glass fibre-reinforced polyamide.

According to another aspect, a method for bending a medium pipe by means of a bend fixture may be provided, the bend fixture comprising a body part in turn comprising a tubular support configured to receive and hold a section of a medium pipe therein, and an inner bend support configured to allow a medium pipe, a section of which being received and held in the tubular support, to be bent about the inner bend support; and further an outer bend support configured to support a medium pipe, a section of which being received and held in the tubular support, the medium pipe being bent about the inner bend support, from an outer side of the bend so as to keep the medium pipe bent; the outer bend support being coupled to the body part via a hinge and being turnable between an open position to allow a section of a medium pipe in substantially straight state to be inserted into the tubular support, and a closed position to keep a medium pipe, a section of which being received and held in the tubular support, bent about the inner bend support.

The method comprises inserting a section of a medium pipe into the tubular support, with the outer bend support in its open position; and turning the outer bend support to its closed state. Advantageously, the method further comprises coupling together the outer bend support, in its open position, and the medium pipe outside the section in the tubular support. Further, said turning the outer bend support to its closed state comprises bending the medium pipe, by exerting a force to the medium pipe at a location outside the bend fixture, about the inner bend support, whereby the outer bend support coupled to the medium pipe is turned towards its closed position. Thereby, the bending moment is not limited by the maximum distance of the outermost part of the outer bend support from the hinge. Instead, it may be adjusted by selecting the location on the medium pipe at which location the bending force is applied on the medium pipe. This allows using a bend fixture having limited dimensions.

All what is described above, in the context of the device aspect, about the definitions and ways of implementation with regard to the bend support and medium pipe apply, mutatis mutandis, to the method aspect also.

The bend support used in the method may be in accordance with any of the bend support examples described above in the context of the device aspect. However, it is also possible to use a bend support not having any specific coupling arrangement to couple the outer bend support and the body part of the bed fixture together. In the latter case, some external coupling arrangement, such as a simple cable tie, may be used for said coupling.

BRIEF DESCRIPTION OF THE DRAWINGS

In the following, the present invention is described with reference to the accompanying drawings.

FIG. 7 shows perspective and side views of another bend fixture.

FIG. 8 shows a flow chart of a method for bending a medium pipe.

DETAILED DESCRIPTION

Figure 1:
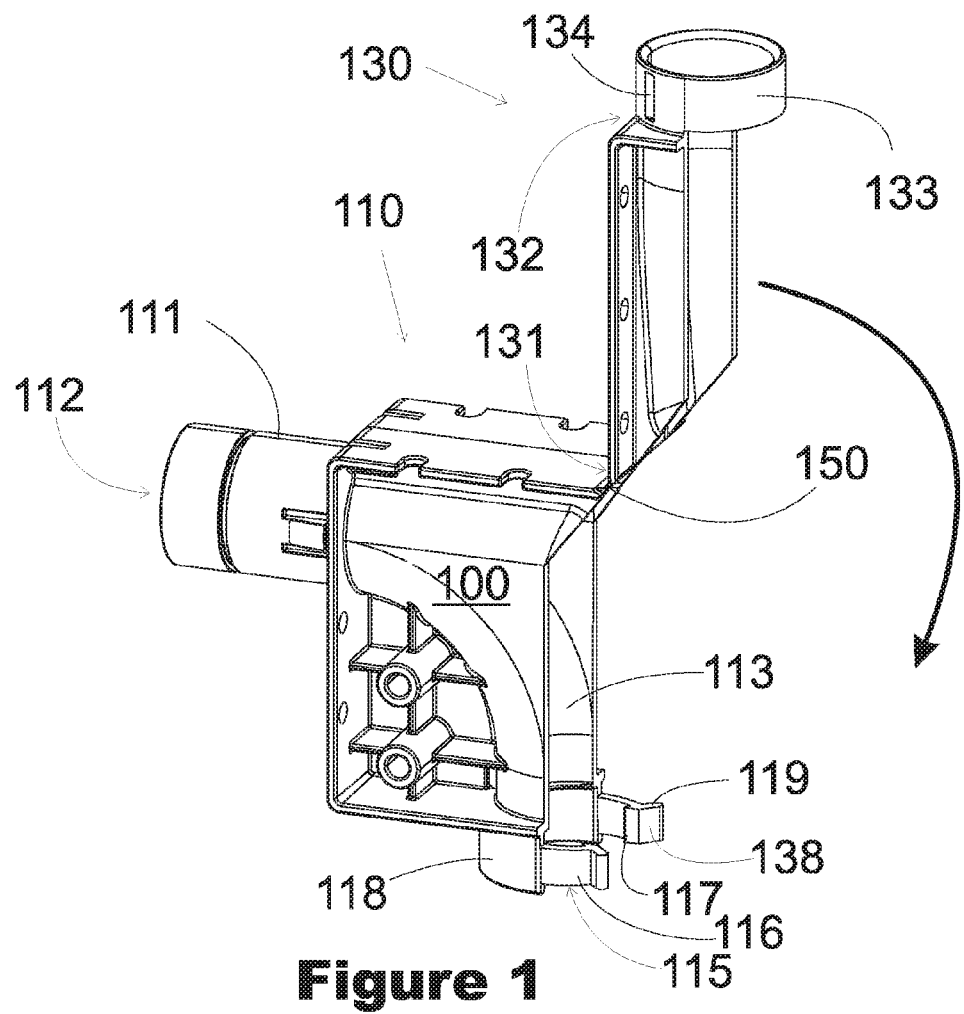
FIG. 1 shows, as a perspective view, an example of a bend fixture.

The bend fixture 100 of FIG. 1 is formed as an integral single-body structure made of a plastic, such as glass fibre-reinforced polyamide or glass fibre-reinforced polyproprene. Such single-body plastic structure may be manufactured e.g. by injection molding.

The bend fixture may be used e.g. as a wall bend fixture for forming a lead-through arrangement where a bent medium pipe, which may be e.g. a water pipe of a tap water network in a building, is led through a wall panel. It may also be used e.g. as a bend fixture for forming a bend in a heating medium pipe running e.g. in a floor structure. Such bend may be needed e.g. for leading such heating medium pipe upwards from the floor structure so that it may be connected to a radiator. However, those are just examples of possible ways of using the bend fixture, not limiting the possible ways of use thereof.

The bend fixture has a body part 110 and a cover part 130, coupled together by means of living hinge 150 between the body part and a first end 131 of the cover part.

Figure 2:
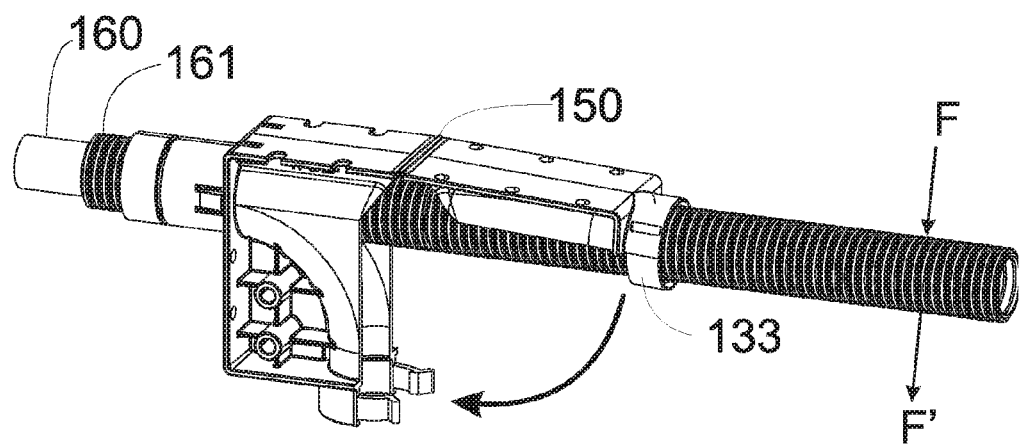
FIGS. 2 and 3 show, as perspective views, a bend fixture according to FIG. 1 with a water pipe inserted into it.

The body part comprises a tubular support 111 forming an tubular channel 112 shaped and dimensioned so that a section of a water pipe 160 as one specific example of a medium pipe may be inserted therein, as illustrated in FIG. 2. The tubular support of the example of FIG. 2 is a straight structure forming a straight tubular channel. However, it might also form a slightly curved tubular channel.

In the example of FIG. 2, the medium pipe is located within a corrugated protective tube 161 having annular grooves on the outer surface thereof. Thus, the shapes and dimensions of the bend fixture are adapted according to such combination of a protective tube and a water pipe therein. It is possible to have also a bend fixture adapted to a plain water pipe without any protective tube.

Figure 4:
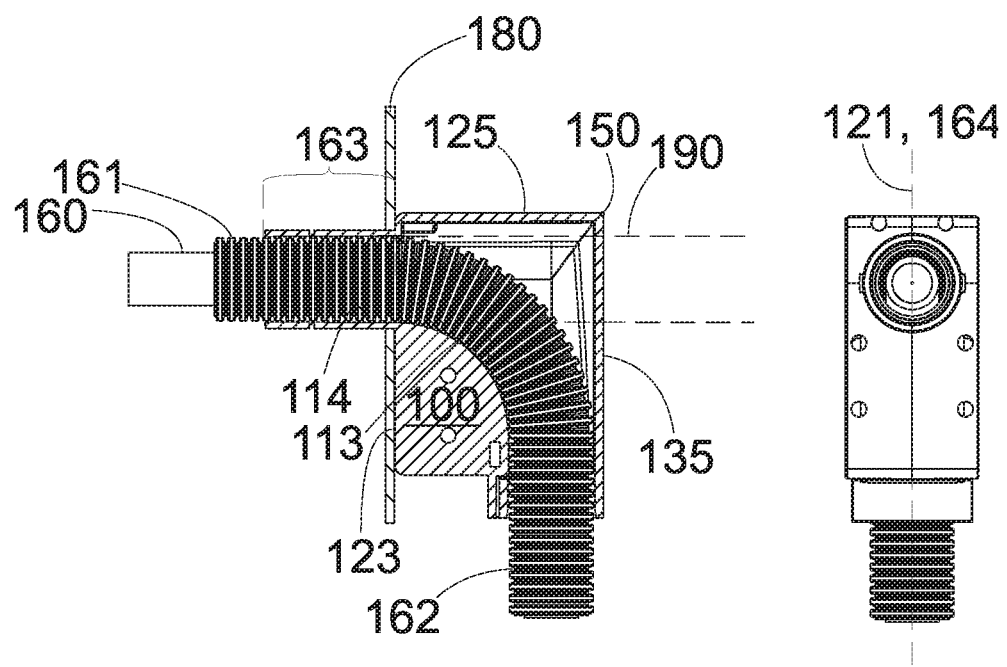
FIG. 4 shows a side sectional view and a front view of a bend fixture according to FIG. 1 with a water pipe inserted into it.

The body part also comprises a chute-like bending support surface 113 extending curvedly from the inner surface 114 of the tubular support forming the tubular channel, as illustrated in FIG. 4. The bending support surface forms an inner bend support supporting a medium pipe 160, a section 163 of which is inserted in the tubular support, and which is bent, outside said section, about the bending support surface, as illustrated e.g. in FIG. 4, whereby the curved bending support surface defines the radius of curvature of the thereby formed bend.

At a second 132 end opposite to the first end, the cover part comprises a coupling ring 133 which is dimensioned so that a water pipe 160, together with a possible protective tube 161 thereon, may be inserted through the coupling ring, as illustrated e.g. in FIG. 2. A medium pipe thereby inserted through the coupling ring becomes coupled together with the cover part so that they cannot be moved, in a direction perpendicular to the longitudinal direction of the medium pipe, relative to each other, despite possible small clearance between the medium pipe or protective tube outer diameter and the inner diameter of the coupling ring.

Figure 3:
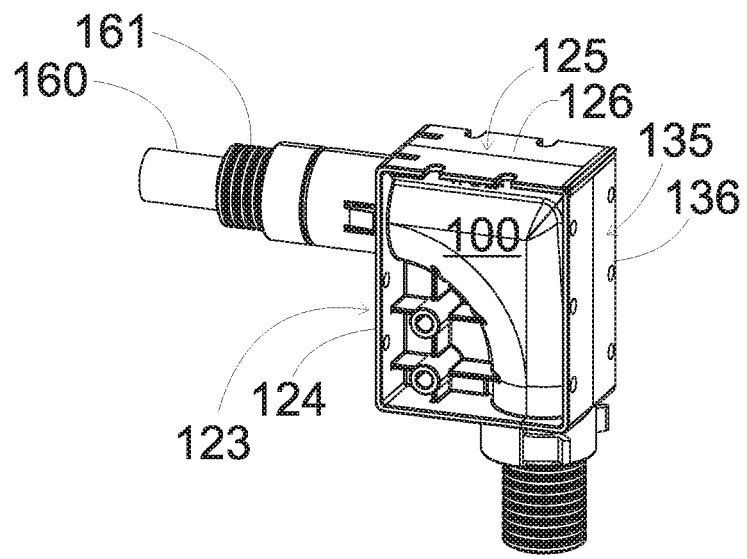

In FIGS. 1 and 2, the cover part is in open positions. With the cover part in an open position, a section of a water pipe 160 together with a protective tube 161 in a straight state, i.e. without being bent, may be inserted into the tubular channel 112 of the tubular support, as illustrated in FIG. 2. The cover part 130 may be turned about the living hinge 150, as illustrated by an arrow in FIGS. 1 and 2. FIG. 3 shows the cover part turned into a closed position wherein the coupling ring has become into contact with the body part.

The cover part has a pair of snap recesses 134, and the body part has a corresponding pair of complementary snap-fitting hooks 115 to form a snap joint between the body part and the coupling ring brought into contact with the body part when the cover part is in the closed position. Thereby, the body part and the cover part may be coupled together. The snap-fitting hooks extend from a semi-circular collar 118 and have arms 116 formed as curved structures, the shapes and dimensions of the collar 118 and the arms being adapted to substantially follow the outer surface of the coupling ring when the cover part is in its closed position. Then, the collar and the arms of the snap-fitting hooks form a circumferential structure surrounding more than a half of the circumference of the coupling ring. Thus, they form an open ring structure having an opening at the side thereof from which the coupling ring of the cover part is brought into this open ring when turning the cover part to its closed position.

Each of the snap-fitting hooks has a tip 117 extending from the free end of the arm 116 towards the inner side of the open ring structure formed by the collar 118 and the snap-fitting hooks 115, the tips being shaped and dimensioned to fit in the corresponding recesses 134 in the coupling ring 133.

Each of the snap-fitting hooks 115 has also a handling protrusion 119 which extends from the free end of the arm of the snap-fitting hook to the opposite side relative to the tip 116. The snap joints formed by the snap-fitting hooks and the complementary recesses 134 may be opened simply by expanding the snap-fitting hooks outwards by means of the handling protrusions.

At the side of the opening of the open ring structure formed by the collar and the snap-fitting hooks, each of the handling protrusions has a widening face 138. The opposite widening faces of the handling protrusions of the opposite snap-fitting hooks form a tapering mouth. When the coupling ring 133 is received in this mouth and pushed further towards the collar by turning the cover part 130 towards its closed position, the widening faces make the snap-fitting hooks bend outwards, thereby widening said opening of the open ring structure, whereby the coupling ring may be inserted within the open ring structure.

The cover part forms an outer bend support which supports in its closed state, when a section of a water pipe 160 together a possible protective tube 161 thereon lies within the tubular support and the water pipe is bent about the bending support surface 113, the water pipe from the outer side of the pipe bend. Thereby it retains the bend, i.e. keeps the water pipe bent by preventing it from straightening.

In the following, a method of forming a bend in a water pipe located within a protective tube is shortly described with reference to FIGS. 2 to 4.

In the method, the cover part 130 is first turned to an open position, and an end of the water pipe together with the protective tube thereon is inserted through the coupling ring 133 and further through the tubular support 111 so that the end extends out of the tubular support, a section of the water pipe lying within the tubular channel 112 formed by the tubular support. The coupling ring encircling the water pipe at a location outside said section then couples the cover part and the water pipe with the protective tube together. As illustrated in FIG. 2, the cover part may be turned into an open position in which said insertion of the water pipe can be made with the water pipe being in substantially straight state.

To allow said insertion of a straight water pipe, the living hinge 150 is located outside a fictitious extension 190 of the tubular channel 112, as illustrated in the side section view of FIG. 4. Thus, the hinge does not form any obstruction for said insertion of the pipe and does not necessitate bending thereof.

Next, a pushing or pulling force F, F' is applied to the water pipe and the protective tube at a location outside the bend fixture 100, thereby bending the water pipe and the protective tube about the curved bending support surface 113. When the pipe is bent, the cover part coupled to it follows it and is thereby turned towards the closed position of the cover part. When bending is completed, the cover part is coupled to the body part by means of a snap joint formed by the snap-fitting hooks 115 of the body part and the complementary recesses 134 in the coupling ring 133. To enable the formation of the snap joint, an additional pushing or pressing force may be applied to the outer surface, i.e. a back surface 135 of the cover part. A situation with completed bending and coupling of the cover part and body part together is illustrated in FIG. 3.

Figure 5:
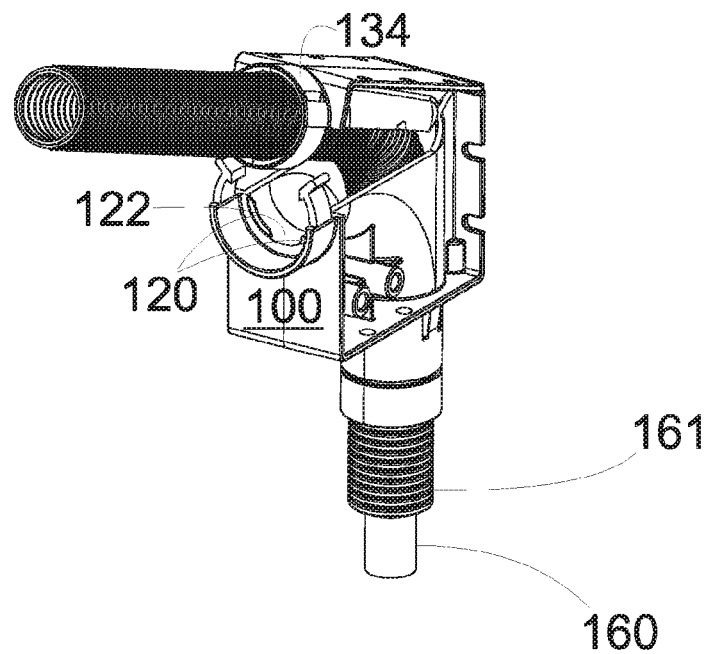
FIG. 5 shows another perspective view of a bend fixture according to FIG. 1 with a water pipe inserted into it.

In may be important in some applications that when a bend is formed in a water pipe and the cover part and the body part are coupled together, the water pipe cannot move slidingly in the longitudinal direction thereof relative to the bend fixture. As illustrated in FIG. 5, to prevent such undesired movement, the body part has a pair of pipe locking ridges 120 which are dimensioned and shaped so that they can fit into a groove 162 on the outer surface of the corrugated protective tube. The ridges are located off the central plane 121 of the body part, which central plane coincides with the central longitudinal cross-sectional plane 164 of the water pipe which is bent about the bending support surface 113. These planes are illustrated in the front view of FIG. 4. Thus, there is a gap 122 between the two ridges around the central plane 121 of the body part. With this location, the ridges may be easily set into a groove 162 on the protective tube outer surface even though the bend would result in closure of the groove around the central longitudinal cross-sectional plane 164 of the water pipe at the inner side of the bend. In the example illustrated in FIG. 5, the ridges lie at a location substantially outside the region in which the pipe bend is to be formed. However, ridges located off the central longitudinal cross-sectional plane 164 of the water pipe could also lie within such bend forming region of the bend fixture.

Because the pipe locking ridges are located in the body part, no corresponding pipe locking members are needed in the cover part. Instead, in the example of FIGS. 1 to 6, the inner surface of the cover member, including the inner surface of the coupling ring 133, is substantially free of any transverse protrusion, thereby allowing a water pipe and a protective tube thereon to slide in the longitudinal direction thereof relative to the cover part and the coupling ring thereof when a pipe partially inserted into the tubular support is bent about the bending support surface 113.

The body part comprises a planar front support surface 123 formed by a front support plate 124, and corresponding planar top support surface 125 formed by a top support plate 126. Correspondingly, the back surface 135 formed by a back support plate 136 of the cover part forms a back support surface of the bend fixture when the cover part is in its closed position. Further, the side edges of the front, top, and back support plates actually form two additional side support surfaces of the bend fixture.

"Front", "back", and "top" refers in this specification to the directions in a situation where a bend fixture is used as a wall bend to form a lead-through of a bent water pipe through a structural wall in a building. Then, "front" and "back" refer to the situation in which the tubular support is inserted through a hole in a wall or a panel from the back side of such wall or panel to the front side thereof. The "top" refers to the fact that typically, a bend is formed in a water pipe running upwards within a wall structure, in which situation the top support surface faces upwards. Naturally, the bend fixture may be used in any orientation deviating from said typical application.

Those support surfaces provide flexible possibilities to support the bend support against various external support surfaces. Those support surfaces comprise holes and slots, as illustrated in the Figures, via which the bend fixture may be mounted to external structures. The body part also comprises two transverse bushings extending from one side support surface to the other, through which bushings the bend support may be screwed to an external support structure lying on the side of the bend fixture.

The front support surface 123 also serves as a stop surface setting, when inserting the tubular support through a hole of a wall or a panel, such as the plate 180 shown in FIG. 4, against the surface of such wall or panel. The front support surface thus serves for ensuring a correct location of the bend fixture relative to the panel by stopping the bend fixture against it.

Figure 6:
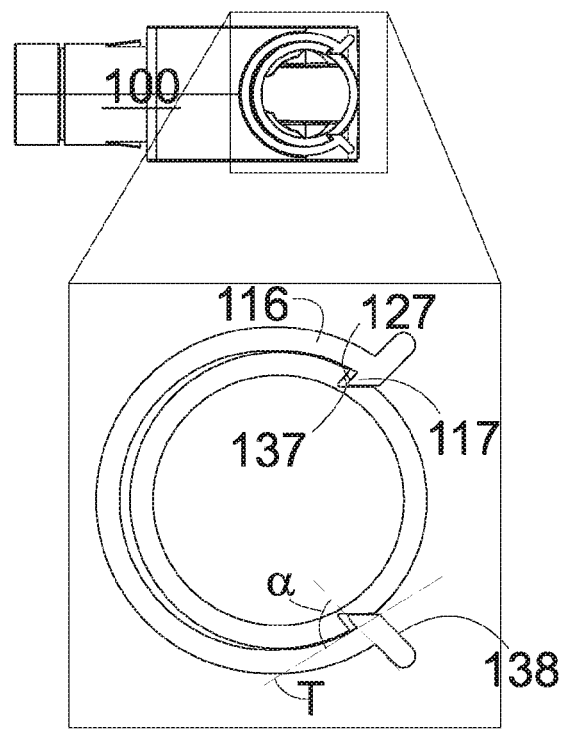
FIG. 6 shows a partial enlargement of a detail of a bend fixture according to FIG. 1.

FIG. 6 shows a detail of the snap joint arrangement coupling together the cover part 130 and the body part 110. The tip 117 of the snap-fitting hook has a tip stop face 127 tilted slightly backwards towards the base of the curved arm of the snap-fitting hook, thereby forming an angle α of less than 90 degrees with the tangential line T of the curved arm. The complementary recess 134 has corresponding backwards-tilted recess stop face 137. With such backwards-tilted tip and recess stop faces, a particularly secure snap joint may be formed.

FIG. 6 also shows the widening faces 138 of the opposite snap-fitting hooks, forming the tapering mouth therebetween, as discussed above, for receiving the coupling ring. FIG. 5 illustrates a situation where the coupling ring 133 is approaching the tapering mouth when the cover part is being turned towards the closed position.

The bend fixture 200 of FIG. 7 differs from the bend fixture 100 of FIGS. 1 to 6 by its different outer shape. Similarly to the bend fixture of FIGS. 1 to 6, the bend fixture 200 of Figure has a body part 210 and a cover part 230 hinged together by means of a living hinge 250. The cover part has a coupling ring 233, which may be coupled to the body part by means of a snap joint arrangement comprising a pair of snap-fitting hooks 215 extending from the body part, and a corresponding pair of complementary recesses 234 in the outer surface of the cover part. The cover part and the body part are shaped so that, with the cover part in its closed position, the cover part and the body part form a substantially tubular structure. The body part comprises a flange-like support plate 224 forming a front support surface 223 serving also as a stop surface similarly to that of the bend fixture of FIGS. 1 to 6.

The left-hand perspective view as well as the middle side view of FIG. 7 illustrates the bend fixture 200 with the cover part 230 thereof in its closed state. The right-hand side view in turn shows the bend fixture with the cover part in an open position.

A method for bending a medium pipe is summarized in a generalized form in the flow cart of FIG. 8. In the example of FIG. 8, any bend fixture comprising a body part, a cover part, and an inner support corresponding to the examples of FIGS. 1 to 7 may be used.

The method starts by inserting a section of a medium pipe into the tubular support of the body part, the outer bend support being in an open state. Before, after, or simultaneously with this step, the outer bend support and the medium pipe outside the section inserted into the tubular support are coupled together. Next, force is exerted to the medium pipe outside the bend fixture to bend the medium pipe about the inner bend support, whereby the outer bend support coupled to the medium pipe is turned towards its closed position.

In said coupling, any suitable coupling means, e.g. a simple cable tie, may be used if the bend fixture does not comprise any specific coupling arrangement similar to those of the examples of FIGS. 1 to 7.

It is to be noted that the present invention is not limited to the examples above. Instead, the embodiments of the present invention can freely vary within the scope of the claims.

The invention claimed is:

1. A bend fixture for bending a medium pipe, the bend fixture comprising:
   a body part comprising
      a tubular support configured to receive a section of a medium pipe therein, and
      an inner bend support configured to allow the section of the medium pipe to be received in the tubular support and to be bent about the inner bend support; and
   an outer bend support configured to support the medium pipe, the section of the medium pipe being received in the tubular support, the medium pipe being bent about the inner bend support, from an outer side of the bend so as to keep the medium pipe bent;
   the outer bend support being coupled to the body part via a hinge and being turnable between an open position to allow the section of the medium pipe in substantially straight state to be inserted into the tubular support, and a closed position to keep the medium pipe, the section of the medium pipe being received in the tubular support, bent about the inner bend support;
   characterized in that the bend fixture comprises a pipe coupling arrangement configured to couple together the outer bend support, in its open position, and the medium pipe, the section of the medium pipe being received in the tubular support, outside a section in the tubular support such that when bending so located medium pipe by pushing or pulling it at a location outside the bend fixture, the outer bend support coupled to the medium pipe follows the medium pipe, thereby turning towards the closed position.

2. A bend fixture as defined in claim 1, wherein the pipe coupling arrangement comprises a coupling ring configured to allow insertion of the medium pipe through the coupling ring.

3. A bend fixture as defined in claim 2, wherein the outer bend support has a first end and a second end, and is coupled to the body part via the hinge from the first end, the pipe coupling arrangement being located substantially at the second end.

4. A bend fixture as defined in claim 2, wherein the inner bend support comprises a curved support surface extending from an inner surface of the tubular support.

5. A bend fixture as defined in claim 2, wherein the body part and the outer bend support comprise complementary snap elements to couple, with the outer bend support in its closed position, the outer bend support to the body part.

6. A bend fixture as defined in claim 2, wherein the body part and the outer bend support comprise complementary snap elements to couple, with the outer bend support in its closed position, the outer bend support to the body part.

7. A bend fixture as defined in claim 6, wherein the complementary snap elements comprise a snap-fitting hook arranged in the body part and a complementary recess arranged in the outer bend support.

8. A bend fixture as defined in claim 7, wherein the snap-fitting hook comprises an arm and a tip, adapted to fit in the complementary recess, extending from the arm to one side thereof, and the snap-fitting hook further comprises a handling protrusion extending from the arm to an opposite side thereof to facilitate opening of a closed snap joint formed by the snap-fitting hook and the complementary recess.

9. A bend fixture as defined in claim 7, wherein the complementary recess is formed on an outer surface of the coupling ring, and wherein the arm is formed as a curved structure substantially following, with a snap joint formed by the snap-fitting hook and the complementary recess, said outer surface of the coupling ring.

10. A bend fixture as defined in claim 7, wherein the snap-fitting hook comprises an arm and a tip, adapted to fit in the complementary recess, extending from the arm to one side thereof, and the snap-fitting hook further comprises a handling protrusion extending from the arm to an opposite side thereof to facilitate opening of a closed snap joint formed by the snap-fitting hook and the complementary recess.

11. A bend fixture as defined in claim 1, wherein the outer bend support has a first end and a second end, and is coupled to the body part via the hinge from the first end, the pipe coupling arrangement being located substantially at the second end.

12. A bend fixture as defined in claim 11, wherein the inner bend support comprises a curved support surface extending from an inner surface of the tubular support.

13. A bend fixture as defined in claim 1, wherein the inner bend support comprises a curved support surface extending from an inner surface of the tubular support.

14. A bend fixture as defined in claim 13, wherein the hinge is a living hinge.

15. A bend fixture as defined in claim 14, wherein the living hinge is located outside a fictitious extension of a tubular channel formed by the tubular support to allow unobstructed insertion of the section of the medium pipe in straight state into the tubular support.

16. A bend fixture as defined in claim 1 for bending the medium pipe located within a protective tube.

17. A bend fixture as defined in claim 16, the protective tube having a corrugated outer surface, wherein the body part comprises a ridge configured to be fitted in a groove of the corrugated outer surface of the protective tube of the medium pipe bent about the inner bend support, the ridge being located off a plane coinciding with a central longitudinal cross-sectional plane of the medium pipe bent about the inner bend support.

18. A bend fixture as defined in claim 1, comprising a substantially planar support surface for supporting the bend fixture against an external support surface.

19. A medium pipe bend arrangement comprising a bend fixture as defined in claim 1 and the medium pipe, possibly located within a protective tube, the section of the medium pipe together with corresponding section of the possible protective tube being located in the tubular support of the bend fixture.

20. A method for bending a medium pipe by a bend fixture comprising:
   a body part comprising
      a tubular support configured to receive a section of the medium pipe therein, and
      an inner bend support configured to allow the section of the medium pipe which is received in the tubular support, to be bent about the inner bend support; and
   an outer bend support configured to support the medium pipe, the section of the medium pipe which is received in the tubular support, the medium pipe being bent about the inner bend support, from an outer side of the bend so as to keep the medium pipe bent;
the outer bend support being coupled to the body part via a hinge and being turnable between an open position to allow the section of the medium pipe in substantially straight state to be inserted into the tubular support, and a closed position to keep the medium pipe, the section of which is received in the tubular support, bent about the inner bend support;
the method comprising:
   inserting the section of the medium pipe into the tubular support, with the outer bend support in its open position; and
   turning the outer bend support to its closed state;
characterized in that the method further comprises coupling together the outer bend support, in its open position, and the medium pipe outside a section in the tubular support; and said turning the outer bend support to its closed state comprises bending the medium pipe, by exerting a force to the medium pipe at a location outside the bend fixture, about the inner bend support, whereby the outer bend support coupled to the medium pipe is turned towards its closed position.

* * * * *